US008634775B2

United States Patent
Oshiba

(10) Patent No.: US 8,634,775 B2
(45) Date of Patent: Jan. 21, 2014

(54) PAIRING SYSTEM, PAIRING APPARATUS, METHOD OF PROCESSING PAIRING APPARATUS, AND PROGRAM

(75) Inventor: Takashi Oshiba, Tokyo (JP)

(73) Assignee: NEC Corporation, Tokyo (JP)

(*) Notice: Subject to any disclaimer, the term of this patent is extended or adjusted under 35 U.S.C. 154(b) by 210 days.

(21) Appl. No.: 13/133,581

(22) PCT Filed: Dec. 10, 2009

(86) PCT No.: PCT/JP2009/006745
§ 371 (c)(1),
(2), (4) Date: Jul. 26, 2011

(87) PCT Pub. No.: WO2010/067605
PCT Pub. Date: Jun. 17, 2010

(65) Prior Publication Data
US 2011/0281523 A1    Nov. 17, 2011

(30) Foreign Application Priority Data
Dec. 11, 2008   (JP) ................................. 2008-315800

(51) Int. Cl.
*H04B 7/00*    (2006.01)
*H04M 3/42*    (2006.01)

(52) U.S. Cl.
USPC ...................................... 455/41.2; 455/414.1

(58) Field of Classification Search
USPC ......... 455/41.1–41.3, 67.14, 414.1, 412, 418, 455/466; 709/222, 227
See application file for complete search history.

(56) References Cited

U.S. PATENT DOCUMENTS

| | | | |
|---|---|---|---|
| 2004/0176118 A1* | 9/2004 | Strittmatter et al. | 455/500 |
| 2004/0203354 A1* | 10/2004 | Yue | 455/41.1 |
| 2005/0021940 A1* | 1/2005 | Ma | 713/155 |
| 2005/0215233 A1* | 9/2005 | Perera et al. | 455/411 |
| 2006/0135204 A1 | 6/2006 | Angelhag | |
| 2008/0090524 A1* | 4/2008 | Lee et al. | 455/41.2 |
| 2008/0132206 A1 | 6/2008 | Suzuki | |
| 2009/0119315 A1* | 5/2009 | Kasbarian | 707/100 |
| 2009/0181653 A1* | 7/2009 | Alharayeri | 455/414.1 |
| 2010/0262696 A1* | 10/2010 | Oshiba | 709/227 |

FOREIGN PATENT DOCUMENTS

| | | |
|---|---|---|
| JP | 2005-269571 A | 9/2005 |
| JP | 3865124 B2 | 10/2006 |
| JP | 2007-527129 A | 9/2007 |
| JP | 2008-99245 A | 4/2008 |

OTHER PUBLICATIONS

Yanai Hiroshi, Z Transform and Its Application—Foundation for Prediction and Estimation, JUSE (Japanese Union of Scientists & Engineers) Press Ltd., Aug. 1988, pp. 91-132.

* cited by examiner

*Primary Examiner* — Andrew Wendell
*Assistant Examiner* — Cindy Trandai
(74) *Attorney, Agent, or Firm* — Foley & Lardner LLP

(57) ABSTRACT

Disclosed is a pairing apparatus 100. When a pairing start request is received from a first terminal and a second terminal, in response to the request, one piece of identifier data, which is used for displaying identifiers on displays of said first terminal and said second terminal, is transmitted to the first terminal, and one or more pieces of the identifier data including the one piece of the identifier data transmitted to the first terminal are transmitted to the second terminal. Thereafter, when one identifier selected from one or more identifiers transmitted to the second terminal is received from the second terminal, it is determined whether or not the identifier received from the second terminal is identical to the one identifier transmitted to the first terminal, and when the determination is yes, the first terminal and the second terminal are paired.

16 Claims, 6 Drawing Sheets

PAIRING SYSTEM, PAIRING APPARATUS, METHOD OF PROCESSING PAIRING APPARATUS, AND PROGRAM

This application is the National Phase of PCT/2009/006745, filed Dec. 10, 2009, which claims priority to Japanese Application No. 2008-315800, filed Dec. 11, 2008, the disclosures of which are hereby incorporated by reference in their entirety.

TECHNICAL FIELD

The present invention relates to a so-called inter-terminal pairing system which links a communication terminal, such as a mobile phone, and an information processing terminal, such as a personal computer (PC), in association with each other, a pairing apparatus, a method of processing a pairing apparatus, and a program.

BACKGROUND ART

Patent Document 1 describes a method which carries out so-called terminal pairing to link terminals having a near field communication function, such as Bluetooth in association with each other. The method described in Patent Document 1 allows simple selection of a terminal to be paired even when there are other multiple terminals near the terminal to be paired.

According to the method described in Patent Document 1, first, a terminal which finds a terminal gradually increases the output of an electric wave for terminal finding and expands the access range of the electric wave in a stepwise manner. Each time a terminal is found, the terminal which finds a terminal stores the found terminal and the steps of the access range of the electric wave at that time together. Next, the terminal which finds a terminal presents each found terminal to a user in each step of the access range of the electric wave at the time of finding, and causes the user to select a terminal to be paired.

Patent Document 2 describes a pairing method in which terminals transmit identification information each other to carry out authentication.

RELATED ART DOCUMENT

Patent Document

Patent Document 1: Japanese Patent No. 3865124
Patent Document 2: Japanese Unexamined Patent Publication No. 2008-099245

Non-Patent Document

Non-Patent Document 1: Yanai Hiroshi, "Z Transform and Its Application—Foundation for Prediction and Estimation", JUSE (Japanese Union of Scientists & Engineers) Press Ltd., August, 1988, pp. 91 to 132)

DISCLOSURE OF THE INVENTION

Technical Problem

However, according to the method described in Patent Document 1, when multiple users carry out a pairing operation simultaneously, collision of the pairing operation is likely to occur because multiple users erroneously select the same terminal.

The reason is as follows. According to the method described in Patent Document 1, if a user starts a pairing operation, one or more terminals found by a terminal which is carried with the user are displayed on the selection screen of the terminal of the user in each access range of the electric wave at the time of finding. For this reason, one or more terminals may he displayed in a single access range. If multiple users start a pairing operation simultaneously, the same terminal may be displayed on the selection screen of a terminal carried with each user in the same access range. Each user should operate to select a terminal to be paired from the terminals displayed on the selection screen. However, according to the method described in Patent Document 1, it is not possible to confirm whether or not a terminal on the selection screen is identical to a terminal in the real world with which the user wants pairing until the pairing operation is completed. For this reason, multiple users are likely to erroneously select the same terminal.

As an example, a scene is considered in which terminals D, E, and F are fixedly arranged at one place, and users X, Y, and Z are present on the circumference of a circle having a radius of 1.5 m around the arrangement position. In this case, if the users X, Y, and Z start a pairing operation simultaneously, the terminals D, E, and F (FIG. 11 of Patent Document 1) are displayed on the selection screen of the terminal carried with each user within the access range of 1 to 2 m. Even when the terminals D, E, and F can be distinguished from each other on the basis of the shape, color, landmark, and the like of the terminals in the real world, the users may not distinguish between the terminals because the terminals are merely handled as symbols of D, E, and F on the selection screen. As a result, even when the user X wants pairing with the terminal D, the user Y wants pairing with the terminal E, and the user Z wants pairing with the terminal F, collision may occur because any one of the users X to Z selects a terminal different from as intended on the selection screen.

With the method described in Patent Document 2, if multiple users carry out a pairing operation simultaneously, it is not possible to prevent collision of the pairing operation because multiple users erroneously select the same terminal.

Accordingly, an object of the invention is to provide a pairing system, a pairing apparatus, a pairing method, and a program capable of reducing the occurrence possibility of collision of a pairing operation between users even when multiple users carry out a pairing operation simultaneously.

Technical Solution

According to the invention, there is provided a pairing apparatus including request receiving unit receiving a pairing start request from a first terminal and a second terminal, transmitting unit transmitting one piece of identifier data, which is used for displaying identifiers on displays of said first terminal and said second terminal, to said first terminal and transmitting one or more pieces of the identifier data including said one piece of the identifier data transmitted to said first terminal to said second terminal in response to said pairing start request, receiving unit receiving a selected identifier, which is one identifier selected from one or more identifiers transmitted to said second terminal, from said second terminal, holding unit holding said selected identifier received from said second terminal by said receiving unit in association with information for identifying the second terminal, and pairing unit determining whether or not said selected identifier held by said holding unit is identical to a first terminal identifier which is said one identifier transmitted to said first terminal, and when the determination result is yes, pairing said first terminal having transmitted the first terminal identifier and said second terminal associated with the selected identifier.

According to the invention, there is provided a pairing system including said pairing apparatus, a first terminal, and a second terminal. Said first terminal includes first instruction input receiving unit receiving an instruction input to carry out pairing from a user, first pairing start request transmitting unit transmitting a pairing start request, which is information indicative of said instruction input being received by said first instruction input receiving unit, to said pairing apparatus, first receiving unit receiving one piece of the identifier data transmitted from said pairing apparatus in accordance with the transmission of said pairing start request, and first display unit displaying one identifier on the display of said first terminal using said one piece of the identifier data received by said first receiving unit. Said second terminal includes second instruction input receiving unit receiving an instruction input to carry out pairing from the user, second pairing start request transmitting unit transmitting said pairing start request, which is information indicative of said instruction input being received by said second instruction input receiving unit, to said pairing apparatus, second receiving unit receiving one or more pieces of the identifier data which are returned from said pairing apparatus in accordance with the transmission of said pairing start request and include said one piece of the identifier data transmitted to said first terminal, second display unit displaying one or more identifiers on the display of said second terminal using said one or more pieces of the identifier data received by said second receiving unit, second selection input receiving unit receiving a selection input of one identifier from said one or more identifiers displayed by said second display unit from the user, and second identifier transmitting unit transmitting a selected identifier, which is said one identifier whose selection input is received by said second selection input receiving unit, to said pairing apparatus.

According to the invention, there is provided a method of processing a pairing apparatus including receiving a pairing start request from a first terminal and a second terminal, transmitting one piece of identifier data, which is used for displaying identifiers on displays of said first terminal and said second terminal, to said first terminal and transmitting one or more pieces of the identifier data including said one piece of the identifier data transmitted to said first terminal to said second terminal in response to said pairing start request, receiving a selected identifier, which is one identifier selected from one or more identifiers transmitted to said second terminal, from said second terminal, storing said selected identifier received from said second terminal in said receiving of the selected identifier in association with information for identifying the second terminal, and determining whether or not said selected identifier stored in said storing of the selected identifier is identical to a first terminal identifier which is said one identifier transmitted to said first terminal, and when the determination result is yes, pairing said first terminal having transmitted the first terminal identifier and said second terminal associated with the selected identifier.

According to the invention, there is provided a program which causes a computer to execute receiving a pairing start request from a first terminal and a second terminal, transmitting one piece of identifier data, which is used for displaying identifiers on displays of said first terminal and said second terminal, to said first terminal and transmitting one or more pieces of the identifier data including said one piece of the identifier data transmitted to said first terminal to said second terminal in response to said pairing start request, receiving a selected identifier, which is one identifier selected from one or more identifiers transmitted to said second terminal, from said second terminal, storing said selected identifier received from said second terminal in said receiving of the selected identifier in association with information for identifying the second terminal, and determining whether or not said selected identifier stored in said storing of the selected identifier is identical to a first terminal identifier which is said one identifier transmitted to said first terminal, and when the determination result is yes, pairing said first terminal having transmitted the first terminal identifier and said second terminal associated with the selected identifier.

Advantageous Effects

According to the invention, it is possible to reduce a possibility that collision of a pairing operation occurs between users even when multiple users carry out a pairing operation simultaneously.

BEST MODE FOR CARRYING OUT THE INVENTION

Figure 1:
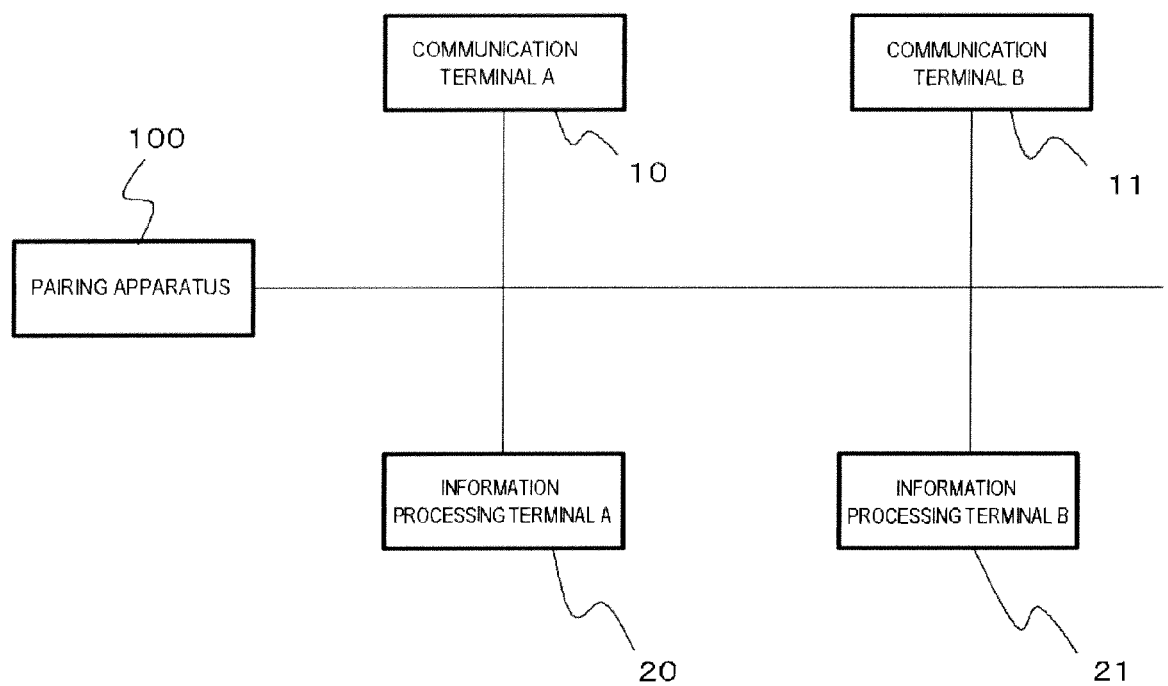
FIG. 1 is a block diagram showing an example of the configuration of a pairing system according to the invention.

Hereinafter, embodiments of the invention will be described with reference to the drawings.

Respective unit constituting a pairing apparatus, a first terminal, and a second terminal of each embodiment is implemented by an arbitrary combination of hardware and software including, at the center thereof, a CPU of an arbitrary computer, a memory, a program which is loaded on the memory (including a program stored in advance in the memory at the time of shipment or a program downloaded from a recording medium, such as a CD, or a server on a network), a storage unit, such as a hard disk, which stores the program, and an interface for connection to the network. Those skilled in the art will understand that there may be various modifications to the method of realization thereof, and the apparatus.

A functional block diagram which is used in the description of each embodiment shows a block of a functional unit rather than the configuration of a hardware unit. Although in the drawings, a case has been described where the pairing apparatus, the first form, and the second form of each embodiment are arranged to be realized by a single separated device, the method of realization thereof is not limited thereto. That is, two or more physically separated devices may be connected in a wired or wireless manner, and a pairing apparatus, a first form, and a second form of this embodiment may be realized by a plurality of devices.

<First Embodiment>

A pairing system of this embodiment includes a first terminal, such as a communication terminal, a second terminal, such as an information processing terminal, and a pairing apparatus. FIG. 1 is a block diagram showing an example of the configuration of a pairing system according to the invention. As shown in FIG. 1, a pairing apparatus 100, a communication terminal A 10, a communication terminal B 11, an information processing terminal A 20, and an information processing terminal B 21 are connected to each other through a communication network, such as Internet and/or a mobile telephone network. Although a case has been described where two communication terminals and two information processing terminals are provided, any number (for example, three or more) of terminals may be provided.

Figure 2:
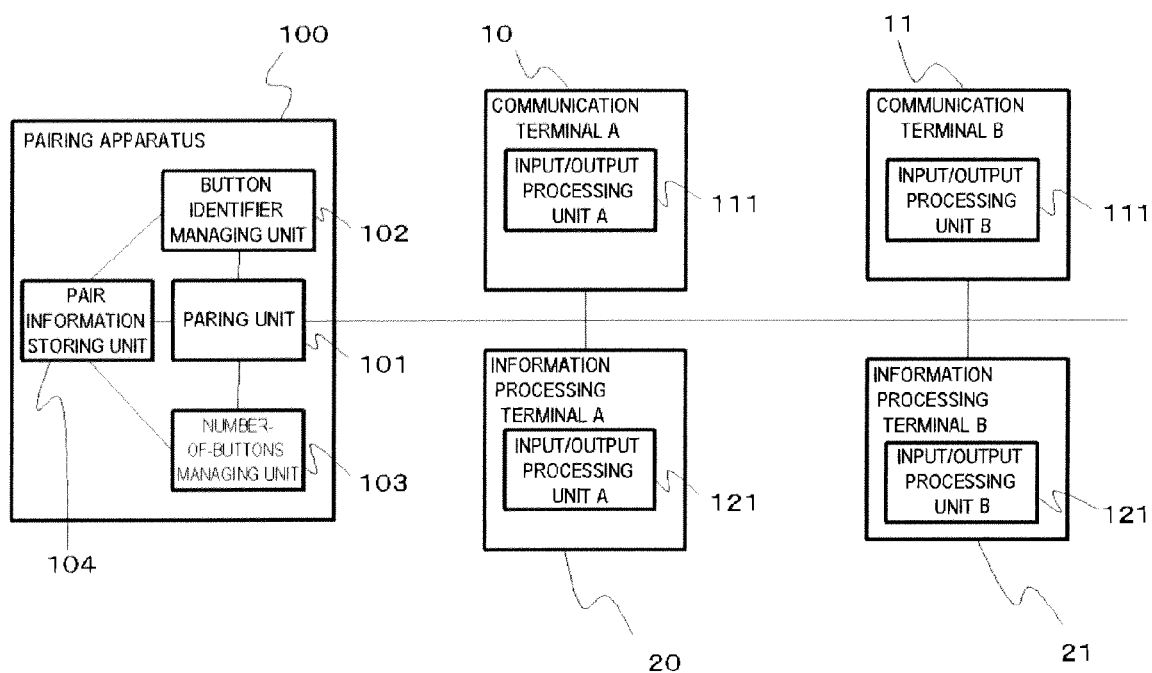
FIG. 2 is a functional block diagram showing an example of the functional configuration of a pairing system.
Figure 3:
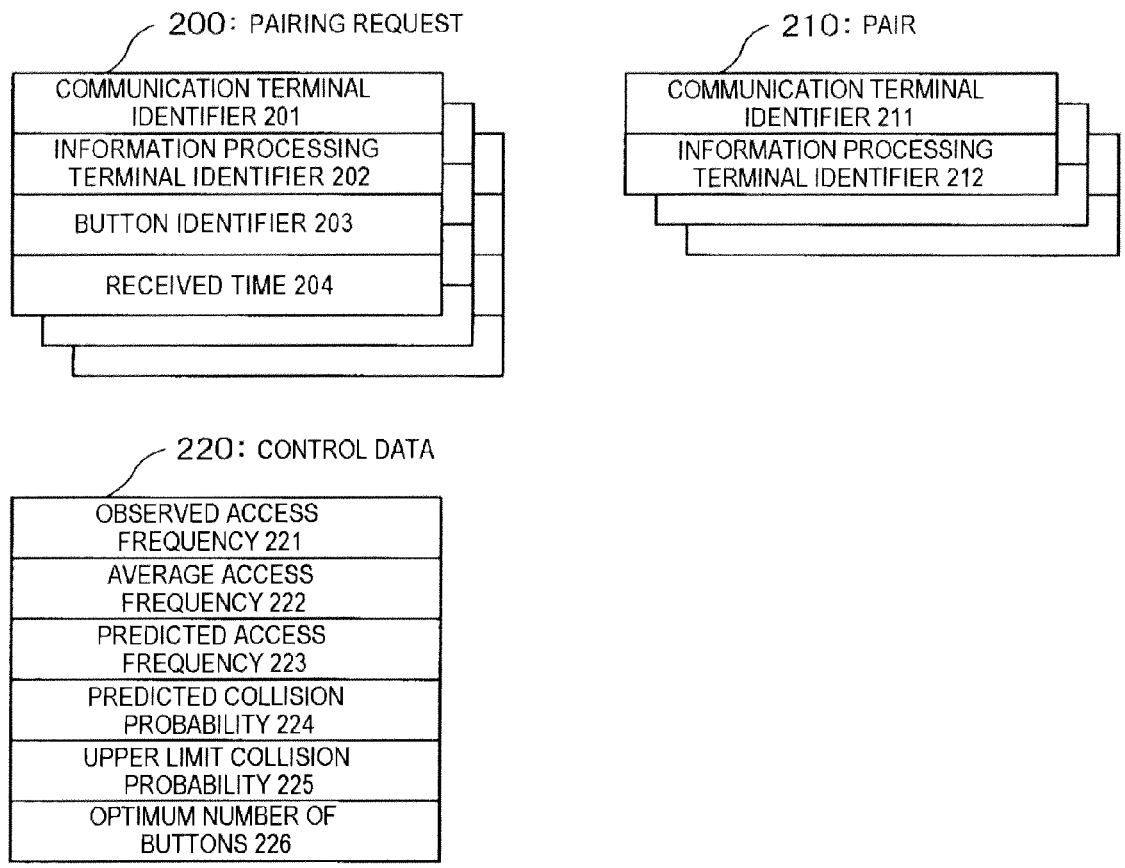
FIG. 3 is an explanatory view showing an example of a data structure in this embodiment.

FIG. 2 is a functional block diagram showing an example of the functional configuration of a pairing system. FIG. 3 is an explanatory view showing an example of a data structure of this embodiment. Hereinafter, description will be provided with reference to FIGS. 2 and 3.

<Description of Pairing Apparatus>

The pairing apparatus 100 is specifically realized by an information processing apparatus, such as a personal computer, which operates in accordance with a program. As shown in FIG. 2, the pairing apparatus 100 includes pairing unit 101, button identifier managing unit 102 which is an embodiment of identifier managing unit, number-of-buttons managing unit 103 which is an embodiment of number-of-identifiers managing unit, and pair information storing unit 104.

The pairing unit 101 is specifically realized by a CPU of an information processing apparatus which operates in accordance with a program. The pairing unit 101 has a function of pairing the first terminal (for example, communication terminal A 10) and the second terminal (for example: information processing terminal A 20) on the basis of a pairing request received from the first terminal (for example: communication terminal A 10) and the second terminal (for example: information processing terminal A 20).

The identifier managing unit (button identifier managing unit 102) is specifically realized by a CPU of an information processing apparatus which operates in accordance with a program. The identifier managing unit (button identifier managing unit 102) generates and holds identifier data which is used for displaying one or more identifiers on the displays of the first terminal and the second terminal. An identifier may be, for example, an identifier in which a unique numeral is given to a GUI component, such as a button, shown in FIG. 5(a). An identifier may be an identifier in which a unique image is given a GUI component, such as a button, shown in FIG. 5(b). An identifier is not particularly limited insofar as the identifier can be distinguished from other identifiers, and a character string or a symbol representing any sign of the Chinese zodiac, a constellation, or the like may be given to a GUI component, such as a button. A character string, such as "It is sunny today" or "Time is money", may be given to a GUI component, such as a button. An identifier is not limited to a GUI component, such as a button, shown in FIGS. 5(a) and (b), and an identifier simply constituted by a numeral, a character, an image, or the like may be displayed. The identifier managing unit (button identifier managing unit 102) has a function of generating identifiers corresponding to the optimum number of identifier (optimum number 226 of buttons) described below. Hereinafter, description will be provided assuming that the pairing apparatus 100 includes button identifier managing unit 102 for managing a button-like identifier (hereinafter, referred to as "button identifier") as identifier managing unit.

The number-of-identifiers managing unit (number-of-buttons managing unit 103) is specifically realized by a CPU of an information processing apparatus which operates in accordance with a program. The number-of-identifiers managing unit has a function of calculating an optimum number (hereinafter, referred to as "optimum number of identifiers") as the number of identifiers which are displayed on the first terminal and the second terminal. The number-of-identifiers managing unit may calculate the optimum number of identifiers on the basis of a frequency with which the pairing start request is received from the first terminal and the second terminal. The number-of-identifiers managing unit may calculate the optimum number of identifiers at every predetermined time (arbitrary design item). For example, the optimum number of identifiers may be calculated at every one hour. In this case, the identifier managing unit (button identifier managing unit 102) generates and holds identifiers corresponding to the latest optimum number of identifiers from the optimum number of identifiers calculated at every predetermined time.

The number-of-buttons managing unit 103 which is an embodiment of the number-of-identifiers managing unit has a function of calculating an optimum number (hereinafter, referred to as "optimum number of buttons"), which is the number of button identifiers displayed on the first terminal and the second terminal, as the optimum number of identifiers. Hereinafter, description will be provided assuming that the pairing apparatus 100 includes the number-of-buttons managing unit 103 for calculating the optimum number of buttons as the number-of-identifiers managing unit. The details of the calculation processing of the optimum number of identifiers will be described below.

The pair information storing unit 104 is specifically realized by a storage device, such as a magnetic disk device or an optical disk device. The pair information storing unit 104 stores a plurality of pairing requests 200, a plurality of pairs 210, and single piece of control data 220 shown in FIG. 3.

A pairing request 200 includes a communication terminal identifier 201 for identifying the communication terminal (first terminal), an information processing terminal identifier 202 for identifying the information processing terminal (second terminal), a button identifier 203 which is transmitted from each terminal, and a received time 204 which represents the time at which the pairing request is received from each terminal.

As shown in FIG. 3, a pair 210 associates a communication terminal identifier 211 for identifying the communication terminal (first terminal) with the pair established and an information processing terminal identifier 212 for identifying the information processing terminal (second terminal) with the pair established.

As shown in FIG. 3, control data 220 includes an observed access frequency 221 which represents the number of pairing start requests received per unit time, an average access frequency 222 which is the average value of the access frequency, a predicted access frequency 223 which is a predicted access frequency value after a predetermined time, a predicted collision probability 224 which represents a probability that erroneous pairing occurs, an upper limit collision probability 225 which represents a tolerant probability that erroneous pairing occurs, and the optimum number 226 of buttons which represents the optimum number of button identifiers displayed by the information processing terminal.

<Description of Communication Terminal A 10 (First Terminal)>

The communication terminal A 10 is realized by, for example, a mobile phone which operates in accordance with a program. As another example, the communication terminal A 10 may be realized by a smartphone, a fixed phone, a PDA, a portable computer, an on-the-street multimedia terminal, an in-vehicle terminal, a game machine, or other similar devices having a function of exchanging information with the outside.

The configuration of the communication terminal B 11 is the same as the communication terminal A 10, thus description thereof will not be repeated.

As shown in FIG. 2, the communication terminal A 10 includes input/output processing unit A 111.

The input/output processing unit A 111 is realized by a CPU, which operates in accordance with a program, a dial key, a microphone, and/or other input devices. The input/output processing unit A 111 is realized by a CPU, which operates in accordance with a program, a display device, a speaker, and/or other output devices. The input/output processing unit A 111 has a function of controlling display of a GUI component, such as a button for carrying out pairing, a text for user-oriented operation description, or the like.

<Description of Information Processing Terminal A 20 (Second Terminal)>

The information processing terminal A 20 is realized by, for example, a person computer (PC) which operates in accordance with a program, a portable computer (PDA), a mobile phone, a smartphone, a fixed phone, an on-the-street multimedia terminal, an in-vehicle terminal, a network connection function-equipped television, a network connection function-equipped set-top box, a game machine, or other similar devices having a function of exchanging information with the outside. The configuration of the information processing terminal B 21 is the same as the information processing terminal A 20, thus description thereof will not be repeated.

As shown in FIG. 3, the information processing terminal A 20 includes input/output processing unit A 121.

The input/output processing unit A 121 is realized by a CPU which operates in accordance with a program, a mouse, a keyboard, a microphone, and/or other input devices. The input/output processing unit A 121 is realized by a CPU which operates in accordance with a program, a display device, a speaker, and/or other output devices. The input/output processing unit A 121 has a function of controlling display of a GUI component, such as a button for carrying out pairing, a text for user-oriented operation description, or the like.

Figure 4:
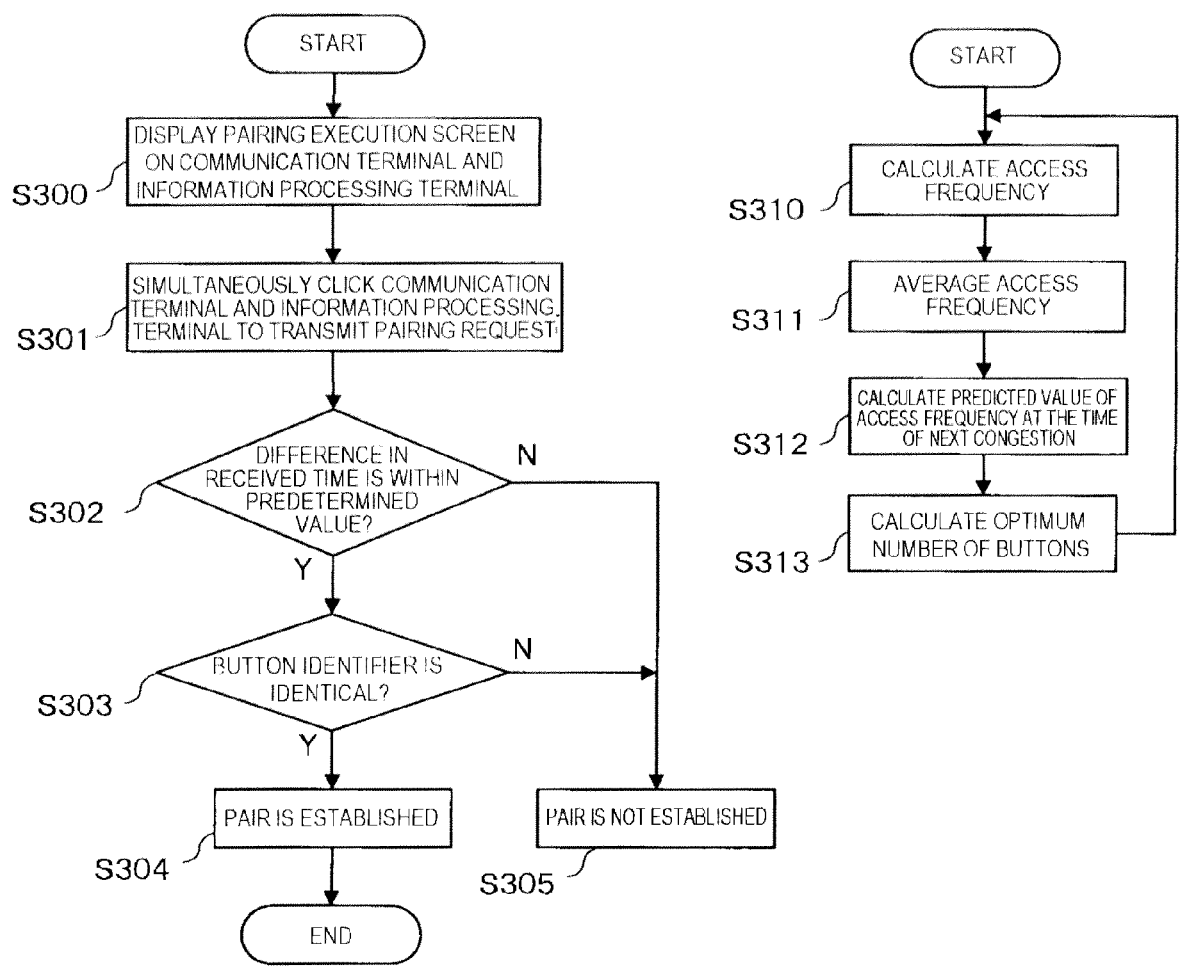
FIG. 4 is a flowchart showing a processing example which is performed in a pairing system.

Next, the operation of the pairing system will be described. FIG. 4 is a flowchart showing a processing example which is performed in the pairing system. Steps S300 to S305 are the flow of pairing which is executed in accordance with a user's operation. In this embodiment, description will be provided assuming that a user A has a communication terminal A 10 and an information processing terminal A 20, and a user B has a communication terminal B 11 and an information processing terminal B 21.

<Step S300>

In Step S300, a pairing execution screen is displayed on the displays of the first terminal and the second terminal.

Specifically, first, the user A who wants to pair the first terminal and the second terminal operates the communication terminal A 10 (first terminal) to carry out an instruction input for starting pairing.

When this happens, the communication terminal A 10 (first terminal) receives the instruction input (first instruction input receiving unit) and transmits a pairing start request, which is information indicative of the instruction input being received, to the pairing apparatus 100 through the communication network (first pairing start request transmitting unit).

When the pairing apparatus 100 receives the pairing start request form the communication terminal A 10, the pairing apparatus 100 randomly selects one piece of identifier data from one or more pieces of identifier data held by the button identifier managing unit 102 at that time, and transmits the selected piece of identifier data to the communication terminal A 10 (first terminal). As the means for randomly selecting one piece of identifier data, for example, extraction processing using a random number may be used. The selection processing may be realized by the button identifier managing unit 102.

When the number-of-buttons managing unit 103 determines the optimum number of buttons at every predetermined time, the button identifier managing unit 102 generates identifier data corresponding to the optimum number of buttons at every time and updates held identifier data.

Thereafter, when the communication terminal A 10 (first terminal) receives one piece of identifier data from the pairing apparatus 100 (first receiving unit), the communication terminal A 10 (first terminal) displays one button identifier on the display using identifier data (first display unit).

The user A operates the information processing terminal A 20 (second terminal) to carry out an instruction input for starting pairing.

When this happens, the information processing terminal A 20 (second terminal) receives the instruction input (second instruction input receiving unit) and transmits a pairing start request, which is information indicative of the instruction input being received, to the pairing apparatus 100 through the communication network (second pairing start request transmitting unit).

When the pairing apparatus 100 receives the pairing start request from the communication terminal A 20, the pairing apparatus 100 transmits all of one or more pieces of identifier data held by the button identifier managing unit 102 at the time to the communication terminal A 20 (second terminal).

Thereafter, when the communication terminal A 20 (second terminal) receives one or more pieces of identifier data from the pairing apparatus 100 (second receiving unit), the communication terminal A 20 (second terminal) displays one or more button identifiers on the display using identifier data (second display unit).

In order to realize the above-described configuration, it is necessary that the pairing apparatus 100 recognizes whether the transmission source of the received pairing start request is the first terminal or the second terminal. Although the means of realization thereof is not particularly limited, for example, when two terminals (first terminal and second terminal) to be paired are of different types, and assuming that the apparatuses are specified (for example: the first terminal is a mobile phone and the second terminal is a PC), determination may be made using transmission destination information (address, model, and the like) given to the pairing start request at the time of transmitting and receiving the pairing start request. As another means, when the instruction input for starting pairing is received from the user, the first terminal and the second terminal are configured to receive a selection input of either the first terminal or the second terminal from the user. In this case, the user selectively inputs the first terminal as one of two terminals to be paired and selectively inputs the second terminal as another terminal. The first terminal and the second terminal transmit information acquired by the input from the user to the pairing apparatus 100 along with the pairing start request. The pairing apparatus 100 may recognize whether or not the transmission source of the received pairing start request is the first terminal or the second terminal on the basis of the information.

<Step S301>

In Step S301, a pairing request which includes one identifier is transmitted from the first terminal and the second terminal to the pairing apparatus 100.

Specifically, the user A operates the communication terminal A 10 (first terminal) to input an instruction to transmit an identifier in one button identifier displayed by the input/output processing unit A 111 of the communication terminal A 10 (first terminal) to the pairing apparatus 100. This may be carried out by an operation to selectively input a button identifier displayed on the display (for example: aligns a cursor position and depresses an OK button).

The user A operates the information processing terminal A 20 (second terminal) to input an instruction to select one button identifier from one or more button identifiers displayed by the input/output processing unit A 121 of the information processing terminal A 20 (second terminal) and to transmit an identifier in the button identifier to the pairing apparatus 100. At this time, the user A selects the same button identifier as one button identifier displayed by the input/output processing unit A 111 of the communication terminal A 10 (first terminal) from one or more button identifiers. This may be carry out by an operation to selectively input one button identifier from one or more button identifiers displayed on the display (for example: aligns a cursor position and depresses an OK button).

The operation (transmission instruction input) to the communication terminal A 10 (first terminal) and the operation (transmission instruction input) to the information processing terminal A 20 (second terminal) are substantially carried out simultaneously (for example, within three seconds).

When this happens, the communication terminal A 10 (first terminal) receives the instruction input (first transmission instruction receiving unit) and transmits a paring request including the identifier as a first terminal identifier to the pairing apparatus 100 (first identifier transmitting unit). The information processing terminal A 20 (second terminal) receives the instruction input (second selection input receiving unit) and transmits a pairing request including the identifier as a selected identifier to the pairing apparatus 100 (second identifier transmitting unit).

Thereafter, the receiving unit of the pairing apparatus 100 receives the pairing request including the first terminal identifier from the communication terminal A 10 (first terminal) and receives the pairing request including the selected identifier from the information processing terminal A 20 (second terminal). When this happens, the pairing unit 101 stores the received pairing request in the pair information storing unit 104 (holding unit) as the pairing request 200.

When storing the pairing request received from the communication terminal A 10 (first terminal), the pairing unit 101 stores identification information of the communication terminal A 10 (first terminal), such as a telephone number, an SIP, and a URI, as (1) the communication terminal identifier 201 in the pair information storing unit 104 (holding unit). The pairing unit 101 stores (2) the information processing terminal identifier 202 in the pair information storing unit 104 (holding unit) with no data. The pairing unit 101 stores the first terminal identifier in the pair information storing unit 104 (holding unit) as (3) the button identifier 203. The pairing unit 101 stores the time, at which the receiving unit of the pairing apparatus 100 receives the pairing request from the communication terminal A 10 (first terminal), in the pair information storing unit 104 as (4) the received time 204.

Similarly, when storing the pairing request received from the information processing terminal A 20 (second terminal), the pairing unit 101 stores (1) the communication terminal identifier 201 in the pair information storing unit 104 (holding unit) with no data. The pairing unit 101 stores identification information of the information processing terminal A 20 (second terminal), such as an IP address or a MAC address and a machine name, in the pair information storing unit 104 as (2) the information processing terminal identifier 202. The pairing unit 101 stores the selected identifier in the pair information storing unit 104 (holding unit) as (3) the button identifier 203. The pairing unit 101 stores the time, at which the receiving unit of the pairing apparatus 100 receives the pairing request from the information processing terminal A 20 (second terminal), in the pair information storing unit 104 as (4) the received time 204.

According to the method described in Patent Document 2, a "terminal", such as a communication device A or B, is a main part for pairing. For this reason, the communication device A or B should have a "function of acquiring the time of the terminal", such as T1, T2, T3, S1, S2, and S3 (see FIG. 5 of Patent Document 2). In general, in order to acquire the time of the terminal on the Web browser, it is necessary that a script language, such as Java (Registered Trademark) Script, operates on the browser. For this reason, when an apparatus, such as a mobile phone, is used in which the script language does not operate on the browser because the terminal is powerless, it is not possible to carry out pairing by the method described in Patent Document 2.

However, in this embodiment, a "server" which is called a pairing apparatus is a main part for pairing. For this reason, with regard to the pairing request from the two terminals (first terminal and second terminal), the determination of pairing is made on the basis of the received time in the pairing apparatus, such that the terminal may not have a "function of acquiring the time of the terminal". Thus, since it is not necessary to acquire the time of the terminal on the Web browser, even in a terminal, such as a mobile phone, in which the script language does not operate, it is possible to carry out pairing.

<Step S302>

In Step S302, it is determined whether or not a time difference between the received time of the pairing request received from the first terminal and the received time of the pairing request received from the second terminal is within a predetermined range.

Specifically, the pairing unit 101 calculates a difference between the value of the received time 204 of the pairing request 200 received from the communication terminal A 10 (first terminal) and the value of the received time 204 of the pairing request 200 received from the information processing terminal A 20 (second terminal) in Step S301. It is determined whether or not the calculated value is within a predetermined value (for example, within five seconds). If it is determined that the calculated value is within the predetermined value, the pairing unit 101 progresses Step S303. Meanwhile, if it is determined that the calculated value is greater than the predetermined value, the pairing unit 101 progresses to Step S305.

The pairing unit which carries out the determination should determine whether each pairing request 200 stored in the pair information storing unit 104 (holding unit) is received from the first terminal or the second terminal. The means for realizing the determination is not particularly limited, and may be realized by, for example, confirming whether any one of the communication terminal identifier 201 and the information processing terminal identifier 202 in the pairing request 200 has no data.

<Step S303>

In Step S303, it is determined whether or not the first terminal identifier received from the first terminal is identical to the selected identifier received from the second terminal.

Specifically, if it is determined in Step S302 that the time difference between the received time of the pairing request from the first terminal and the received time of the pairing request from the second terminal is within the predetermined value, the pairing unit 101 determines whether or not the button identifier 203 (first terminal identifier) included in the pairing request 200 of the first terminal is identical to the button identifier 203 (selected identifier) included in the pairing request 200 of the second terminal. If the determination result is yes, the pairing unit 101 progresses to Step S304. Meanwhile, if the determination result is no, the pairing unit 101 progresses to Step S305.

A case is considered where the user A who has the communication terminal A 10 (first terminal) and the information processing terminal A 20 (second terminal) and the user B who has the communication terminal B 11 (first terminal) and the information processing terminal B 21 (second terminal) (three or more users including a user C, a user D, and the like) carry out the operation of Step S301 simultaneously. In this case, a button identifier which is transmitted to each communication terminal (first terminal) by the pairing apparatus 100 is randomly selected from the button identifiers held by the identifier managing unit. For this reason, there is a high probability that different identifiers are transmitted to the communication terminals (first terminal). That is, there is a high probability that the button identifier 203 which is transmitted from the communication terminal A 10 (first terminal) and the information processing terminal A 20 (second terminal) of the user A to the pairing apparatus 100 and the button identifier 203 which is transmitted from the communication terminal B 11 (first terminal) and the information processing terminal B 21 (second terminal) of the user B to the pairing apparatus 100 have different values. Thus, even when multiple users carry out the operation of Step S301 simultaneously, all users can progress to Step S304 with a high probability.

As described above, in this embodiment, even when three (or more) terminals transmit a pairing request simultaneously, two terminals which transmit a pairing request with the same identifier are paired. For this reason, even when three or more terminals transmit a pairing request simultaneously, it is possible to prevent an unintended pair from being established.

<Step S304>

In Step S304, the first terminal and the second terminal are paired.

Specifically, it is determined in Step S303 that the button identifier 203 of the first terminal is identical to the button identifier 203 of the second terminal, the pairing unit 101 newly generates a pair 210 (see FIG. 4) in which the communication terminal identifier 211 of the first terminal and the information processing terminal identifier 212 of the second terminal are associated with each other. The pairing unit 101 pairs the first terminal specified by the communication terminal identifier 211 and the second terminal specified by the information processing terminal identifier 212.

<Step S305>

As the result of determination in Step S302 or Step S303, if the processing progresses to Step S305, the pair of the communication terminal A 10 and the information processing terminal A 20 is not established, and the pairing system displays a message which requests the user to carry out a pairing operation again. As a method of displaying a message, for example, the pairing apparatus 100 transmits the processing result of pairing to the communication terminal A 10 (first terminal) and the information processing terminal A 20 (second terminal). When the communication terminal A 10 (first terminal) and the information processing terminal A 20 (second terminal) receives the processing result, the communication terminal A 10 (first terminal) and the information processing terminal A 20 (second terminal) displays the message on the display using message data held in advance. Message data may be transmitted along with the processing result when the pairing apparatus 100 transmits the processing result to the communication terminal A 10 (first terminal) and the information processing terminal A 20 (second terminal). When a message is displayed, the first terminal, the second terminal, and the pairing apparatus 100 wait for an instruction to start pairing in Step S300.

As described above, in this embodiment, when the user operates the first terminal to carry out an input for starting pairing, one identifier which is randomly selected from a plurality of identifiers is displayed on the display of the first terminal. When the user operates the second terminal to carry out an input for starting pairing, one or more identifiers which include one identifier displayed on the display of the first terminal are displayed on the display of the second terminal.

When the user simultaneously carry out an instruction input for transmitting an identifier displayed on the first terminal to the pairing apparatus and an instruction input for transmitting one identifier from one or more identifiers displayed on the second terminal to the pairing apparatus, the pairing apparatus which receives the identifiers determines whether or not to pair the first terminal and the second terminal. Specifically, when the difference in the received time between the two pairing requests is within the predetermined value and the identifiers in the two pairing requests are identical, the pairing apparatus pairs the first terminal and the second terminal.

Therefore, in this embodiment, since an identifier which is displayed on the first terminal can differ between the users with a high probability, even when multiple users carry out a pairing operation simultaneously, it is possible to reduce a possibility that collision of the pairing operation occurs between the users.

In this embodiment, as the number of pieces of identifier data which is stored in the identifier managing unit further increases, it is possible to reduce the occurrence probability of collision of the pairing operation between the users. However, if the number of pieces of identifier data is too large, a large number of identifiers are displayed on the screen of the second terminal. For this reason, it takes an increasing workload for the user to find out the same identifier as the identifier displayed on the first terminal from a large number of identifiers. With regard to this problem, in this embodiment, processing which is performed in the pairing apparatus 100 will be described. Steps S310 to S313 shown in FIG. 4 are the flow of calculation processing of the optimum number 226 of buttons which is performed in the pairing apparatus 100 at every predetermined period.

<Step S310>

First, the number-of-buttons managing unit 103 counts the number of pairing start requests or pairing request 200 received from the time before a predetermined time to the current time. Hereinafter, an example will be described where the number of pairing requests 200 is counted. Even when the number of pairing start requests is counted, the same operational effects can be realized by the same processing as described below.

Thereafter, the number-of-buttons managing unit 103 calculates a value which is obtained by dividing the count number by the time from the time before the predetermined time to the current time (the unit is count number/seconds). The number-of-buttons managing unit 103 stores the calculated value in the pair information storing unit 104 as the observed access frequency 221 (Step S310).

<Step S311>

Next, the number-of-buttons managing unit 103 carries out computation for averaging the observed access frequency 221 by a predetermined expression and stores the computation result (the unit is count number/seconds) in the pair information storing unit 104 as the average access frequency 222 (Step S311).

If averaging is not carried out, for example, since an incidental error is included in the observed access frequency 221 which is observed in Step S310 at every predetermined period, when the observed access frequency 221 has a large value, the optimum number 226 of buttons calculated in Step S313 is overvalued and has a large value. As a result, an unnecessary workload is imposed on the user. For example, when an incidental error included and the observed access frequency 221 has a small value, the optimum number 226 of buttons is undervalued and has a small value. As a result, the occurrence probability of collision exceeds the value of the upper limit collision probability 225.

That is, if averaging is carried out, it is advantageous in that it is possible to allow a less sensitive response to the regular observation result of the observed access frequency 221.

<Step S312>

Next, the number-of-buttons managing unit 103 performs processing for predicting the access frequency 221, which is predicted to be observed in Step S310 of the calculation processing of the next optimum number 226 of buttons, using the average access frequency 222 by a predetermined expression. The number-of-buttons managing unit 103 stores the computation result (the unit is count number/seconds) in the pair information storing unit 104 as the predicted access frequency 223 (Step S312).

With the near future prediction, it is possible to prevent the occurrence probability of collision from exceeding the upper limit collision probability 225, instead of coping with when this situation occurs.

<Step S313>

Next, the number-of-buttons managing unit 103 calculates the optimum number 226 of buttons (Step S313). The details are as follows.

As an assumption, the occurrence probability of collision in pairing of this embodiment corresponds to a call loss probability in a telephone network. The reason will be described below.

In the telephone network, in order to make a call from one point to another point, a relay line is provided to connect the points. In the queuing theory, when the number of relay lines at one point is S, a call is generated because of Poisson occurrence, and the average talk time follows an exponential distribution, the telephone network is modeled by a model M/M/S(0). It is known that a call loss probability which is a probability that all the relay lines are in busy and blocked can be computed by the Erlang B formula. It is also known that, when the average constantly follows a regular unit distribution, the telephone network is modeled by a model M/D/S(0), and the call loss probability can be computed by the Erlang B formula in the same manner as described above.

In the pairing of this embodiment, it can be considered that the optimum number 226 of buttons corresponds to the S relay lines in the telephone network. In Step S302, processing is performed for confirming whether or not the difference in the received time is within the predetermined value, and this corresponds to a case where calling is constantly carried out for a predetermined time in all the calls in the telephone network. In the pairing of this embodiment, collision occurs when multiple users carry out a pairing operation simultaneously, and as a result, one or more pairing requests are incoming while the processing of the pairing operation is performed on the basis of the number of button identifiers 203 corresponding to the value of the optimum number 226 of buttons.

That is, the occurrence probability of collision in the pairing of this embodiment corresponds to the call loss probability of the model M/D/S(0) in the telephone network and can be computed by the Erlang B formula.

The Erlang B formula has three arguments of the number of buttons, the predicted access frequency 223 which is obtained in Step S312, and the predetermined value which is used in determining the difference in the received time in Step S302. The number-of-buttons managing unit 103 computes the Erlang B formula to calculate the occurrence probability of collision which is predicted to be observed in Step S310 of the calculating processing of the next optimum number 226 of buttons.

In this step, the number-of-buttons managing unit 103 computes the collision probability at that time by the Erlang B formula while incrementing the number of buttons as a first argument by 1 with an initial value of 1 in a state where the predicted access frequency 223 as a second argument and the defined value as a third argument are fixed. When the computed value of the collision probability is equal to or smaller than the value of the upper limit collision probability 225, the number-of-buttons managing unit 103 stores the value of the number of buttons at that time in the pair storage device 104 as the optimum number 226 of buttons.

In this step, after the value of the optimum number 226 of buttons is updated, in Step S300, the button identifier managing unit 102 uses the updated value of the optimum number 226 of buttons.

Thus, when the occurrence frequency of the pairing operation by the user is large, the button identifier managing unit 102 displays a button identifier, which is randomly selected from a large number (for example, 10) of button identifiers, on the input/output processing unit A 111 of the communication terminal A 10. The button identifier managing unit 102 also displays a large number (for example, 10) of button identifiers on the input/output processing unit A 121 of the information processing terminal A 20. To the contrary, when the occurrence frequency of the pairing operation by the user is small, the button identifier managing unit 102 displays a button identifier, which is randomly selected from a small number (for example, 3) of button identifiers, on the input/output processing unit A 111 of the communication terminal A 10. The button identifier managing unit 102 also displays a small number (for example, 3) of button identifiers on the input/output processing unit A 121 of the information processing terminal A 20. Therefore, it is possible to prevent erroneous pairing even when the occurrence frequency of the pairing operation is large and to reduce a processing load when the occurrence frequency of the pairing operation is small.

Next, when Step S313 ends, it waits for a predetermined time, and the processing returns to the initial state.

By comparison of this embodiment and the method described in Patent Document 1, according to the method described in Patent Document 1, it is not possible to simply carry out a pairing operation. The reason is that, according to the method described in Patent Document 1, as described above, it is not possible to easily recognize to which terminal in the real world each terminal corresponds.

As an example, a scene is considered in which a terminal G is present at a distance of 2.1 m from a user and a terminal H is present at a distance of 2.9 m back from the user. In this case, the terminals G and H are displayed as the terminals G and H in the access range of 2 to 3 m of the section screen. In order to avoid erroneous selection of a terminal, the user temporarily cancels the pairing operation. Then, the user starts a pairing operation again after slightly approaching a terminal, and should confirm whether or not the terminal G is displayed in the access range of 1 to 2 m and the terminal H is displayed in the access range of 2 to 3 m.

In this embodiment, the pairing apparatus calculates the number of pairing requests received per unit time and the collision occurrence probability at every predetermined period. The pairing apparatus computes the minimum number of candidates of an identifier having a collision occurrence probability equal to or smaller than a predetermined value by a predetermined expression.

Accordingly, it is possible to display the minimum number of identifiers having a collision occurrence probability equal to or smaller than a predetermined value on the display of the second terminal in accordance with the occurrence frequency of the pairing request from the user. For this reason, it is possible to reduce a workload when the user finds out the same identifier as the identifier displayed on the display of the first terminal from the buttons, thereby simply carrying out a pairing operation.

Although the processing for pairing the communication terminal (first terminal) and the information processing terminal (second terminal) has been described, the invention is not limited to a combination of a communication terminal and an information processing terminal, and may be applied to another combination of various terminals (for example, a combination of information processing terminals).

Although an example has been described where, in Step S301, the pairing apparatus 100 receives the first terminal identifier from the first terminal and creates the pairing request 200 (see FIG. 4) using the received information, a different configuration may be made. For example, in Step S300, when transmitting one piece of identifier data to the first terminal, the pairing apparatus 100 may create the pairing request 200. In this case, the received time 204 of the pairing request 200 may be the received time of the pairing start request or the transmitted time of identifier data from the pairing apparatus 100 to the first terminal. In Step S302, determination may be made on a difference between the time and the time at which the pairing request including the selected identifier is received from the second terminal. In this case, the time difference set in advance is determined to be greater (for example, five minutes) than the time difference (for example: three seconds) in the above-described configuration. In this case, it is not necessary for the user to carry out an operation to transmit the first terminal identifier from the first terminal. That is, a user-friendly configuration can be realized.

<Second Embodiment>

A second embodiment of the invention will be described with reference to FIG. 5. This embodiment further embodies the pairing system of the first embodiment.

When the user A carries out a pairing operation of the communication terminal A 10 (first terminal) and the information processing terminal A 20 (second terminal), which screen transition occurs and which operation is carried out will be described with reference to FIG. 5. The operation image of Steps S310 to S313 will be described with reference to FIG. 5.

Figure 5:
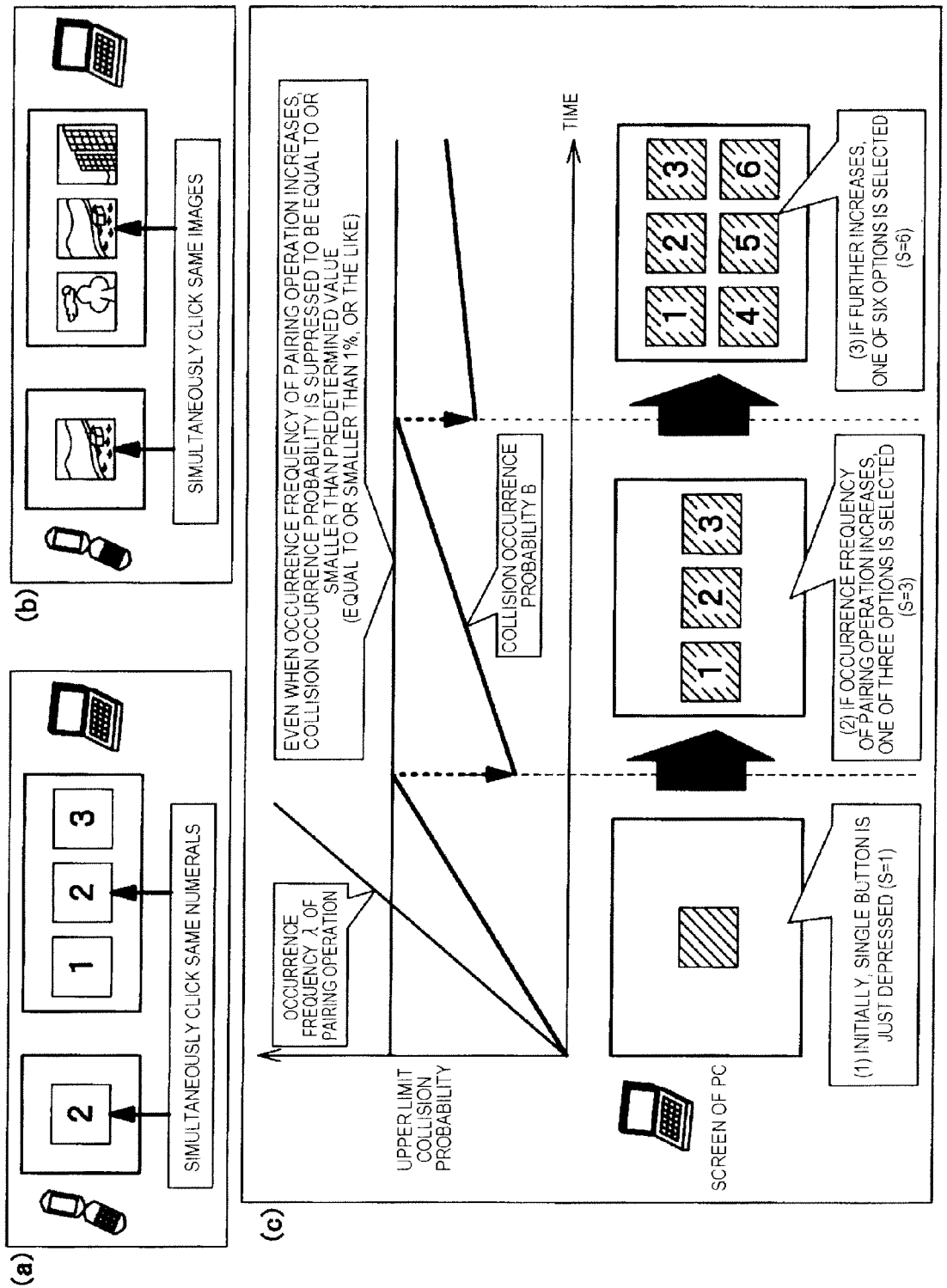
FIG. 5 is an explanatory view showing a screen example and an operation image example.

FIG. 5 is an explanatory view showing a screen example and an operation image example. FIG. 5(a) is an explanatory view showing an example of a screen for carrying out pairing which is displayed when, in Step S300, the user A operates the communication terminal A 10 (first terminal) and the information processing terminal A 20 (second terminal). FIG. 5(a) shows an example where numerals are used as the button identifiers which are displayed on the displays of the communication terminal A 10 (first terminal) and the information processing terminal A 20 (second terminal). FIG. 5(a) also shows a processing example where, in Step S301, the communication terminal A 10 (first terminal) and the information processing terminal A 20 (second terminal) are operated to substantially transmit the same identifiers to the pairing apparatus 100 simultaneously (the button identifiers are substantially clicked simultaneously).

FIG. 5(b) shows an example where images are used as the button identifiers, unlike FIG. 5(a). A button identifier is not limited to a numeral or an image, and a character string or a symbol representing any sign of the Chinese zodiac or a constellation may be used if distinguishable. A character string, such as "It is sunny today" or "Time is money", may be used as a button identifier.

FIG. 5(c) is an explanatory view showing the operation image of Steps S310 to S313 when the occurrence frequency of the pairing operation of the user increases. FIG. 5(c) shows an example where the optimum number 226 of buttons is changed from 1 to 3 and from 3 to 6 such that the predicted collision probability 224 does not exceed the upper limit collision probability 224.

<Third Embodiment>

A third embodiment the invention will be described with reference to Expressions (1) to (4). This embodiment further embodies the predetermined expression which is used in Step S311 to S313 of the pairing system of the first embodiment. Expressions (1) to (4) are an example of the predetermined expression which is used in Steps S311 to S313. In the averaging of Step S311 and the prediction of Step S312, for example, a moving-average method or an exponential smoothing method described in Non-Patent Document 1 (Yanai Hiroshi, "Z Transform and Its Application—Foundation for Prediction and Estimation", JUSE (Japanese Union of Scientists & Engineers) Press Ltd., August, 1988, pp. 91 to 132) may be used. Expressions (1) to (3) are expressions when the exponential smoothing method is used.

[Equation 1]

$$f_1(t) = \alpha \cdot \lambda(t) + (1-\alpha)f_1(t-1) \qquad (1)$$

[Equation 2]

$$f_2(t) = \alpha \cdot f_1(t) + (1-\alpha)f_2(t-1) \qquad (2)$$

[Equation 3]

$$\lambda_{next} = 2f_1(t) - f_2(t) + \frac{\alpha}{1-\alpha}\{f_1(t) - f_2(t)\} \qquad (3)$$

In Expression (1), $f_1(t)$ on the left side is a current average access frequency. In Expression (1), $\alpha$ is an averaging constant. In Expression (1), $\lambda(t)$ is a current observed access frequency. In Expression (1), $f_1(t-1)$ is a previous average access frequency.

In Expression (2), $f_2(t)$ on the left side is the average value of $f_1(t)$.

In Expression (3), $\lambda_{next}$ on the left side is a predicted access frequency, Expression (1) is simply substituted into $f_1(t)$ on the right side, and Expression (2) is simply substituted into $f_2(t)$.

[Equation 4]

$$B(S, \lambda_{next}, h) = \frac{\frac{(\lambda_{next}h)^S}{S!}}{\sum_{n=0}^{S} \frac{(\lambda_{next}h)^n}{n!}} \quad (4)$$

The Erlang B formula which is used in Step S313 is expressed by Expression (4). In Expression (4), S as a first argument on the left side is the number of buttons (the number of identifiers). In Expression (4), a second argument on the left side is the predicted access frequency 223 computed by Expression (3). In Expression (4), h as a third argument on the left side is the predetermined value which is used in determining the difference in the received time in Step S302.

Figure 6:
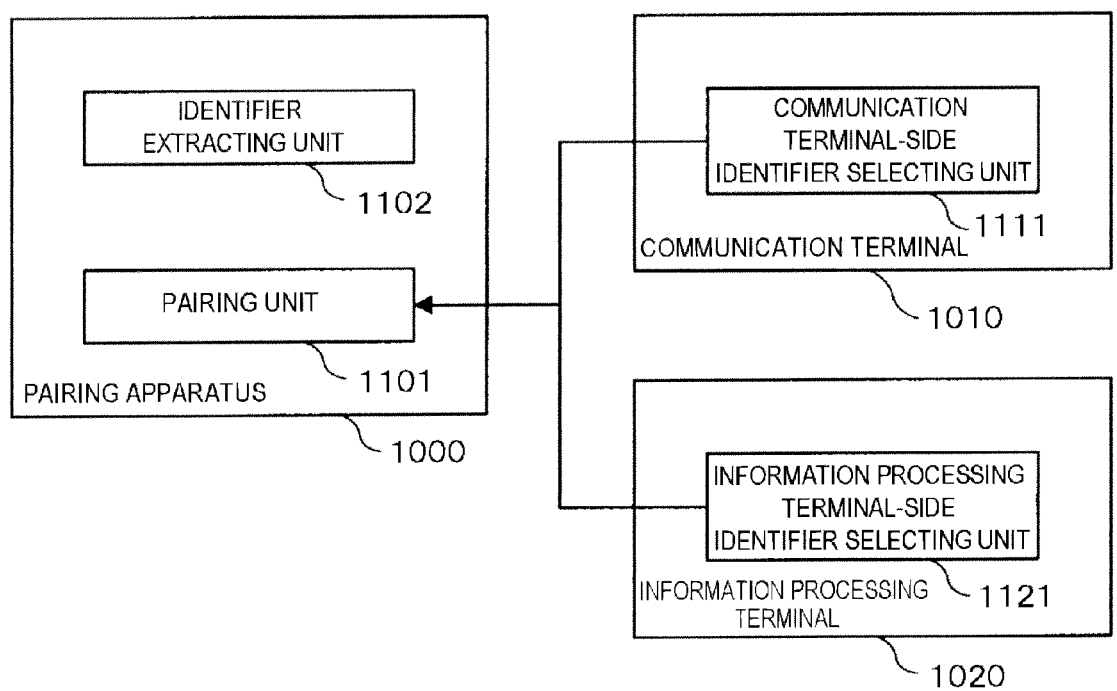
FIG. 6 is a flowchart showing a minimum processing example of a pairing system.

Next, another configuration of the pairing system according to the invention will be described. FIG. 6 is a functional block diagram showing another configuration example of a pairing system. A pairing system shown in FIG. 6 includes a pairing apparatus 1000, a communication terminal 1010 (first terminal), and an information processing terminal 1020 (second terminal). The pairing apparatus 1000 includes identifier extracting unit 1102 and pairing unit 1101. The communication terminal 1010 (first terminal) includes communication terminal-side identifier selecting unit 1111. The information processing terminal 1020 (second terminal) includes information processing terminal-side identifier selecting unit 1121.

In the pairing system shown in FIG. 6, the identifier extracting unit 1102 randomly extracts one piece of identifier data from one or more pieces of identifier data held by the identifier managing unit each time a pairing start request is received from the communication terminal 1010 (first terminal). Extracted identifier data is transmitted to the communication terminal 1010 (first terminal). The identifier extracting unit 1102 extracts all of one or more pieces of identifier data held by the identifier managing unit each time a pairing start request is received from the information processing terminal 1020 (second terminal). Extracted identifier data is transmitted to the information processing terminal 1020 (second terminal).

Thereafter, when the communication terminal 1010 (first terminal) receives one piece of identifier data, the communication terminal-side identifier selecting unit 1111 displays one identifier on the display using identifier data, and also receives a selection input of the identifier from the user. When the information processing terminal 1020 (second terminal) receives one or more pieces of identifier data, the information processing terminal-side identifier selecting unit 1121 displays one or more identifiers on the display using one or more pieces of identifier data, and also receives a selection input of one identifier from the one or more identifiers from the user. The identifiers whose selection input is received by the communication terminal-side identifier selecting unit 1111 and the information processing terminal-side identifier selecting unit 1121 are transmitted to the pairing apparatus 1000. The identifiers are used for processing in the pairing unit 1101. The processing content of the pairing unit 1101 is as described above, thus description thereof will not be repeated.

With this pairing system, it is possible to realize the same operational effects as those in the above-described pairing system.

In this embodiment, the characteristic configuration of a method of processing a pairing apparatus and a program which is executed in a pairing apparatus described in (1) and (2) is illustrated.

(1) A method of processing a pairing apparatus including receiving a pairing start request from a first terminal and a second terminal, transmitting one piece of identifier data to said first terminal and transmitting one or more pieces of identifier data including said one piece of identifier data transmitted to said first terminal to said second terminal in response to said pairing start request, identifier data being used for displaying identifiers on the displays of said first terminal and said second terminal, receiving a selected identifier, which is one identifier selected from a plurality of identifiers transmitted to said second terminal, from said second terminal, storing said selected identifier received from said second terminal in said receiving of the selected identifier in association with information for identifying the second terminal, and determining whether or not said selected identifier stored in said storing of the selected identifier is identical to a first terminal identifier which is said one identifier transmitted to said first terminal, and when the determination result is yes, pairing said first terminal having transmitted the first terminal identifier and said second terminal associated with the selected identifier.

(2) A program which causes a computer to execute receiving a pairing start request from a first terminal and a second terminal, transmitting one piece of identifier data to said first terminal and transmitting one or more pieces of identifier data including said one piece of identifier data transmitted to said first terminal to said second terminal in response to said pairing start request, identifier data being used for displaying identifiers on the displays of said first terminal and said second terminal, receiving a selected identifier, which is one identifier selected from a plurality of identifiers transmitted to said second terminal, from said second terminal, storing said selected identifier received from said second terminal in said receiving of the selected identifier in association with information for identifying the second terminal, and determining whether or not said selected identifier stored in said storing of the selected identifier is identical to a first terminal identifier which is said one identifier transmitted to said first terminal, and when the determination result is yes, pairing said first terminal having transmitted the first terminal identifier and said second terminal associated with the selected identifier.

This application claims priority based on Japanese Patent Application No. 2008-315800 filed on Dec. 11, 2008, the disclosure of which is incorporated herein by reference.

According to the invention, a communication terminal in hand and an information processing terminal can be paired in an ad hoc manner, such that the invention can be applied for the purpose of creating a value-added service for an SI provider of an intranet, a carrier, or an ISP with respect to a telephone service of only verbal communication.

- 10, 1010: communication terminal A
- 11: communication terminal B
- 20, 1020: information processing terminal A
- 21: information processing terminal B
- 100: pairing apparatus
- 101: pairing unit
- 102: button identifier managing unit
- 103: number-of-buttons managing unit
- 104: pair information storing unit
- 111, 121: input/output processing unit
- 200: pairing request
- 201, 211: communication terminal identifier
- 202, 212: information processing terminal identifier
- 203: button identifier
- 204: received time
- 210: pair
- 220: control data 221: observed access frequency
222: average access frequency
223: predicted access frequency
224: predicted collision probability
225: upper limit collision probability
226: optimum number of buttons
1000: pairing apparatus
1101: pairing unit
1102: identifier extracting unit
1111: communication terminal-side identifier selecting unit
1121: information processing terminal-side identifier selecting unit

The invention claimed is:

1. A pairing apparatus comprising:
a request receiving unit configured to receive a pairing start request from a first terminal and a second terminal;
a transmitting unit configured to transmit one piece of identifier data, which is used for displaying identifiers on displays of said first terminal and said second terminal, to said first terminal and transmit one or more pieces of the identifier data including said one piece of the identifier data transmitted to said first terminal to said second terminal in response to said pairing start request;
a receiving unit configured to receive a selected identifier, which is one identifier selected from one or more identifiers transmitted to said second terminal, from said second terminal;
a holding unit configured to hold said selected identifier received from said second terminal by said receiving unit in association with information for identifying the second terminal; and
a pairing unit configured to determine whether or not said selected identifier held by said holding unit is identical to a first terminal identifier which is said one identifier transmitted to said first terminal, and when the determination result is yes, pair said first terminal having transmitted the first terminal identifier and said second terminal associated with the selected identifier.

2. The pairing apparatus as set forth in claim 1,
wherein said receiving unit receives said first terminal identifier, which is said identifier transmitted to said first terminal, from said first terminal,
said holding unit holds said first terminal identifier received from said first terminal by said receiving unit in association with information for identifying the first terminal, and
said pairing unit carries out said determination using said first terminal identifier held by said holding unit and said selected identifier.

3. The pairing apparatus as set forth in claim 2,
wherein, when said receiving unit receives said first terminal identifier or said selected identifier, said holding unit holds the first terminal identifier or the selected identifier in association with a received time, and
when said one first terminal identifier held by said holding unit is specified, said pairing unit extracts said selected identifier, which is associated with said received time with a time difference from said received time of said specified first terminal identifier within a predetermined range, from said selected identifier held by said holding unit, and determines whether or not said extracted selected identifier is identical to said specified first terminal identifier.

4. The pairing apparatus as set forth in claim 1,
wherein, when said transmitting unit transmits one piece of the identifier data to said first terminal, said holding unit holds information for identifying the first terminal in association with a first terminal identifier which is said one identifier transmitted to the first terminal, and
said pairing unit carries out said determination using said first terminal identifier held by said holding unit and said selected identifier.

5. The pairing apparatus as set forth in claim 1, further comprising:
an identifier managing unit configured to generate and hold said one or more pieces of the identifier data,
wherein said transmitting unit transmits said one piece of the identifier data randomly selected from said one or more pieces of the identifier data held by said identifier managing unit when transmitting one piece of the identifier data to said first terminal and transmits all of said one or more pieces of the identifier data held by said identifier managing unit when transmitting one or more pieces of the identifier data to said second terminal.

6. The pairing apparatus as set forth in claim 5, further comprising:
a number-of-identifiers managing unit configured to determine an optimum number of identifiers, which is said number of pieces of the identifier data generated and held by said identifier managing unit, on the basis of a frequency with which said pairing start request is received from said first terminal and said second terminal at every predetermined time,
wherein said identifier managing unit generates and holds said number of pieces of the identifier data, which corresponds to said optimum number of identifiers determined by said number-of-identifiers managing unit at every predetermined time.

7. The pairing apparatus as set forth in claim 6,
wherein said number-of-identifiers managing unit includes:
an access frequency calculating unit configured to calculate an access frequency representing a number of times of receiving said pairing start request per unit time at every predetermined time,
an access frequency averaging unit configured to average said access frequency calculated by said access frequency calculating unit,
a predicted access frequency value calculating unit configured to calculate a predicted access frequency value after a predetermined period on the basis of the access frequency averaged by said access frequency averaging unit, and
an optimum-number-of-identifiers calculating unit configured to calculate said optimum number of identifiers on the basis of said predicted access frequency value by said predicted access frequency value calculating unit.

8. The pairing apparatus as set forth in claim 7,
wherein said access frequency averaging unit averages said access frequency by a moving-average method or an exponential smoothing method.

9. The pairing apparatus as set forth in claim 7,
wherein said predicted access frequency value calculating unit calculates said predicted access frequency value by a moving-average method or an exponential smoothing method.

10. The pairing apparatus as set forth in claim 7,
wherein said optimum-number-of-identifiers calculating unit receives a plurality of pairing start requests after a predetermined period, calculates a collision probability representing an occurrence probability of erroneous pairing on the basis of a plurality of pairing start requests, and calculates a minimum number of identifiers having said collision occurrence probability equal to or smaller than a predetermined value by a predetermined expression.

11. The pairing apparatus as set forth in claim 10, wherein said predetermined expression is the Erlang B formula of the queuing theory.

12. A pairing system comprising:
a pairing apparatus comprising:
a request receiving unit configured to receive a pairing start request from a first terminal and a second terminal;
a transmitting unit configured to transmit one piece of identifier data, which is used for displaying identifiers on displays of said first terminal and said second terminal, to said first terminal and transmit one or more pieces of the identifier data including said one piece of the identifier data transmitted to said first terminal to said second terminal in response to said pairing start request;
a receiving unit configured to receive a selected identifier, which is one identifier selected from one or more identifiers transmitted to said second terminal, from said second terminal;
a holding unit configured to hold said selected identifier received from said second terminal by said receiving unit in association with information for identifying the second terminal; and
a pairing unit configured to determine whether or not said selected identifier held by said holding unit is identical to a first terminal identifier which is said one identifier transmitted to said first terminal, and when the determination result is yes, pair said first terminal having transmitted the first terminal identifier and said second terminal associated with the selected identifier;
a first terminal; and
a second terminal,
wherein said first terminal includes:
 a first instruction input receiving unit configured to receive an instruction input to carry out pairing from a user,
 a first pairing start request transmitting unit configured to transmit a pairing start request, which is information indicative of said instruction input being received by said first instruction input receiving unit, to said pairing apparatus,
 a first receiving unit configured to receive one piece of the identifier data returned from said pairing apparatus in accordance with the transmission of said pairing start request, and
 a first display unit configured to display one identifier on the display of said first terminal using said one piece of the identifier data received by said first receiving unit, and
said second terminal includes:
 a second instruction input receiving unit configured to receive an instruction input to carry out pairing from the user,
 a second pairing start request transmitting unit configured to transmit said pairing start request, which is information indicative of said instruction input being received by said second instruction input receiving unit, to said pairing apparatus,
 a second receiving unit configured to receive one or more pieces of the identifier data which are returned from said pairing apparatus in accordance with the transmission of said pairing start request and include said one piece of the identifier data transmitted to said first terminal, a second display unit configured to display one or more identifiers on the display of said second terminal using said one or more pieces of the identifier data received by said second receiving unit,
 a second selection input receiving unit configured to receive a selection input of one identifier from said one or more identifiers displayed by said second display unit from the user, and
 a second identifier transmitting unit configured to transmit a selected identifier, which is said one identifier whose selection input is received by said second selection input receiving unit, to said pairing apparatus.

13. The pairing system as set forth in claim 12, wherein said first terminal further includes:
a first transmission instruction receiving unit configured to receive an instruction input to transmit a first terminal identifier as said one identifier displayed by said first display unit to said pairing apparatus from the user, and
a first identifier transmitting unit configured to transmit said first terminal identifier to said pairing apparatus when the transmission instruction is received by said first transmission instruction receiving unit as a trigger.

14. A method of processing a pairing apparatus, the method comprising:
receiving, by the pairing apparatus having one or more processors, a pairing start request from a first terminal and a second terminal;
transmitting, by the pairing apparatus one piece of identifier data, which is used for displaying identifiers on displays of said first terminal and said second terminal, to said first terminal and transmitting one or more pieces of the identifier data including said one piece of the identifier data transmitted to said first terminal to said second terminal in response to said pairing start request, the identifier data being used for displaying identifiers on the displays of said first terminal and said second terminal;
receiving, by the pairing apparatus, a selected identifier, which is one identifier selected from one or more identifiers transmitted to said second terminal, from said second terminal;
storing, by the pairing apparatus, said selected identifier received from said second terminal in said receiving of the selected identifier in association with information for identifying the second terminal; and
determining, by the pairing apparatus, whether or not said selected identifier stored in said storing of the selected identifier is identical to a first terminal identifier which is said one identifier transmitted to said first terminal, and when the determination result is yes, pairing said first terminal having transmitted the first terminal identifier and said second terminal associated with the selected identifier.

15. A non-transitory computer readable storage medium having a program stored therein the program being executed by a computer to cause the computer to perform operations comprising:
receiving a pairing start request from a first terminal and a second terminal;
transmitting one piece of identifier data, which is used for displaying identifiers on displays of said first terminal and said second terminal, to said first terminal and transmitting one or more pieces of the identifier data including said one piece of the identifier data transmitted to said first terminal to said second terminal in response to said pairing start request, the identifier data being used for displaying identifiers on the displays of said first terminal and said second terminal;

receiving a selected identifier, which is one identifier selected from one or more identifiers transmitted to said second terminal, from said second terminal;

storing said selected identifier received from said second terminal in said receiving of the selected identifier in association with information for identifying the second terminal; and determining whether or not said selected identifier stored in said storing of the selected identifier is identical to a first terminal identifier which is said one identifier transmitted to said first terminal, and when the determination result is yes, pairing said first terminal having transmitted the first terminal identifier and said second terminal associated with the selected identifier.

16. The pairing apparatus as set forth in claim 1,
wherein said receiving unit receives said selected identifier from said second terminal after said transmitting unit transmits one or more identifiers to said second terminal.

* * * * *

UNITED STATES PATENT AND TRADEMARK OFFICE
CERTIFICATE OF CORRECTION

PATENT NO. : 8,634,775 B2
APPLICATION NO. : 13/133581
DATED : January 21, 2014
INVENTOR(S) : Takashi Oshiba It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 254 days.

Signed and Sealed this
Twenty-second Day of September, 2015

Michelle K. Lee
*Director of the United States Patent and Trademark Office*